United States Patent
Downie et al.

(10) Patent No.: US 7,667,574 B2
(45) Date of Patent: Feb. 23, 2010

(54) SIGNAL-PROCESSING SYSTEMS AND METHODS FOR RFID-TAG SIGNALS

(75) Inventors: John D. Downie, Painted Post, NY (US); Richard E. Wagner, Painted Post, NY (US); James S. Sutherland, Corning, NY (US); Matthew S. Whiting, Lawrenceville, PA (US); Leo Nederlof, Antwerpen (BE)

(73) Assignee: Corning Cable Systems, LLC, Hickory, NC (US)

( * ) Notice: Subject to any disclaimer, the term of this patent is extended or adjusted under 35 U.S.C. 154(b) by 454 days.

(21) Appl. No.: 11/638,894

(22) Filed: Dec. 14, 2006

(65) Prior Publication Data

US 2008/0143486 A1    Jun. 19, 2008

(51) Int. Cl.
*H04Q 5/22* (2006.01)
(52) U.S. Cl. ...................... 340/10.1; 375/316
(58) Field of Classification Search ............... 340/10.1, 340/572.4; 375/316
See application file for complete search history.

(56) References Cited

U.S. PATENT DOCUMENTS

| | | | |
|---|---|---|---|
| 4,889,977 A | 12/1989 | Haydon | |
| 5,483,467 A | 1/1996 | Krupka et al. | |
| 5,528,222 A | 6/1996 | Moskowitz et al. | |
| 5,661,470 A | 8/1997 | Karr | 340/825.54 |
| 5,821,510 A | 10/1998 | Cohen et al. | |
| 5,910,776 A | 6/1999 | Black | |
| 5,914,862 A | 6/1999 | Ferguson et al. | |
| 5,995,006 A | 11/1999 | Walsh | |
| 6,002,331 A | 12/1999 | Laor | 340/539 |
| 6,025,725 A | 2/2000 | Gershenfeld et al. | |
| 6,078,251 A * | 6/2000 | Landt et al. | 340/10.41 |
| 6,100,804 A | 8/2000 | Brady et al. | |
| 6,118,379 A | 9/2000 | Kodukula et al. | |
| 6,127,929 A | 10/2000 | Roz | |
| 6,133,835 A | 10/2000 | De Leeuw et al. | |
| 6,164,551 A | 12/2000 | Altwasser | |
| 6,232,870 B1 | 5/2001 | Garber et al. | |
| 6,424,263 B1 | 7/2002 | Lee et al. | |
| 6,424,315 B1 | 7/2002 | Glenn et al. | |
| 6,496,113 B2 | 12/2002 | Lee et al. | |

(Continued)

FOREIGN PATENT DOCUMENTS

DE    19841738    3/2000

(Continued)

*Primary Examiner*—Thomas J Mullen
(74) *Attorney, Agent, or Firm*—Kwadjo Adusei-Poku (57) ABSTRACT

Systems and methods for reading a RFID-tag signal in the presence of noise and other propagation and circuit impairments using a RFID-tag reader are disclosed. The method includes receiving with a RFID-tag reader multiple copies of an original RFID-tag signal from a RFID tag. The original RFID-tag signal comprises an original bit sequence representative of information stored in the RFID tag. At least some of the received RFID-tag signal copies differ from one another due to noise or other signal impairments. The received multiple copies are processed on a sample-by-sample basis in the RFID-tag reader using digital signal processing techniques to obtain an improved received digitized RFID tag signal that substantially removes the noise and other impairments. This improved signal is used to recover the original bit sequence and thus the information stored in the RFID tag.

24 Claims, 4 Drawing Sheets

U.S. PATENT DOCUMENTS

| | | |
|---|---|---|
| 6,496,382 B1 | 12/2002 | Ferguson et al. |
| 6,501,807 B1 * | 12/2002 | Chieu et al. .................. 375/329 |
| 6,522,308 B1 | 2/2003 | Mathieu |
| 6,618,022 B2 | 9/2003 | Harvey |
| 6,693,513 B2 | 2/2004 | Tuttle |
| 6,784,802 B1 | 8/2004 | Stanescu |
| 6,808,116 B1 | 10/2004 | Eslambolchi et al. |
| 6,829,427 B1 | 12/2004 | Becker |
| 6,847,856 B1 | 1/2005 | Bohannon |
| 6,857,897 B2 | 2/2005 | Conn |
| 6,898,368 B2 | 5/2005 | Colombo et al. |
| 6,915,050 B2 | 7/2005 | Koyasu et al. |
| 6,924,997 B2 | 8/2005 | Chen et al. |
| 6,968,994 B1 | 11/2005 | Ashwood Smith |
| 6,971,895 B2 | 12/2005 | Sago et al. |
| 6,973,243 B2 | 12/2005 | Koyasu et al. |
| 6,999,028 B2 | 2/2006 | Egbert |
| 7,014,100 B2 | 3/2006 | Zierolf |
| 7,068,912 B1 | 6/2006 | Becker |
| 7,069,345 B2 | 6/2006 | Shteyn |
| 7,080,945 B2 | 7/2006 | Colombo et al. |
| 7,081,808 B2 | 7/2006 | Colombo et al. |
| 7,102,520 B2 | 9/2006 | Liu et al. |
| 7,151,455 B2 | 12/2006 | Lindsay et al. |
| 7,158,031 B2 | 1/2007 | Tuttle |
| 7,158,033 B2 | 1/2007 | Forster |
| 7,165,728 B2 | 1/2007 | Durrant et al. |
| 7,170,393 B2 | 1/2007 | Martin |
| 7,194,180 B2 | 3/2007 | Becker |
| 7,205,898 B2 | 4/2007 | Dixon et al. |
| 7,210,858 B2 | 5/2007 | Sago et al |
| 7,221,277 B2 | 5/2007 | Caron et al. |
| 7,224,278 B2 | 5/2007 | Phaneuf et al. |
| 7,224,280 B2 | 5/2007 | Ferguson et al. |
| 7,233,250 B2 | 6/2007 | Forster |
| 7,243,837 B2 | 7/2007 | Durrant et al. |
| 7,253,735 B2 | 8/2007 | Gengel et al. |
| 7,265,674 B2 | 9/2007 | Tuttle |
| 7,275,970 B2 | 10/2007 | Hoshina |
| 7,297,028 B2 | 11/2007 | Daikuhara et al. |
| 7,298,266 B2 | 11/2007 | Forster |
| 7,298,330 B2 | 11/2007 | Forster |
| 7,306,489 B2 | 12/2007 | Werthman et al. |
| 7,336,883 B2 | 2/2008 | Scholtz |
| 7,349,605 B2 | 3/2008 | Noonan et al. |
| 7,352,285 B2 | 4/2008 | Sakama et al. |
| 7,352,289 B1 | 4/2008 | Harris |
| 7,356,208 B2 | 4/2008 | Becker |
| 2002/0092347 A1 | 7/2002 | Niekerk et al. |
| 2003/0021580 A1 | 1/2003 | Matthews |
| 2003/0058126 A1 | 3/2003 | Fling et al. ............... 340/853.8 |
| 2003/0061393 A1 | 3/2003 | Steegmans et al. |
| 2004/0041714 A1 | 3/2004 | Forster |
| 2004/0114879 A1 | 6/2004 | Hiereth et al. |
| 2004/0117515 A1 | 6/2004 | Sago et al. |
| 2004/0149736 A1 | 8/2004 | Clothier |
| 2004/0253874 A1 | 12/2004 | Plishner |
| 2005/0052287 A1 | 3/2005 | Whitesmith et al. |
| 2005/0068179 A1 | 3/2005 | Roesner |
| 2005/0076982 A1 | 4/2005 | Metcalf et al. |
| 2005/0093677 A1 | 5/2005 | Forster et al. |
| 2005/0170784 A1 | 8/2005 | Ariyoshi et al. .......... 455/67.13 |
| 2005/0201450 A1 | 9/2005 | Volpi et al. .................. 375/150 |
| 2005/0215119 A1 | 9/2005 | Kaneko |
| 2005/0224585 A1 | 10/2005 | Durrant et al. |
| 2005/0232636 A1 | 10/2005 | Durrant et al. |
| 2005/0259930 A1 | 11/2005 | Elkins, II et al. |
| 2006/0044148 A1 | 3/2006 | Daniels et al. |
| 2006/0148279 A1 | 7/2006 | German et al. |
| 2006/0166546 A1 | 7/2006 | Ashizawa et al. |
| 2006/0232419 A1 | 10/2006 | Tomioka et al. |
| 2006/0233506 A1 | 10/2006 | Noonan et al. |
| 2006/0267778 A1 | 11/2006 | Gengel et al. |
| 2007/0023525 A1 | 2/2007 | Son et al. |
| 2007/0120684 A1 | 5/2007 | Utaka et al. |
| 2007/0152828 A1 | 7/2007 | Mohalik |
| 2007/0205897 A1 | 9/2007 | Forster |
| 2007/0216534 A1 | 9/2007 | Ferguson et al. |
| 2007/0236355 A1 | 10/2007 | Flaster et al. |
| 2007/0247284 A1 | 10/2007 | Martin et al. |
| 2007/0297534 A1 * | 12/2007 | Okunev ..................... 375/316 |

FOREIGN PATENT DOCUMENTS

| | | |
|---|---|---|
| DE | 10249414 | 5/2004 |
| EP | 0593131 A1 | 10/1993 |
| EP | 1455550 A2 | 9/2004 |
| GB | 2371211 A | 7/2002 |
| JP | 03-242795 | 10/1991 |
| JP | 2002-264617 | 9/2002 |
| JP | 2003-148653 | 5/2003 |
| JP | 2003-172827 | 6/2003 |
| JP | 2003-229215 | 8/2003 |
| JP | 2004-039389 | 2/2004 |
| JP | 2004-142500 | 5/2004 |
| JP | 2004-152543 | 5/2004 |
| JP | 2004-245963 | 9/2004 |
| JP | 2004-247090 | 9/2004 |
| JP | 2004-264901 | 9/2004 |
| JP | 2004-265624 | 9/2004 |
| JP | 2004-317737 | 11/2004 |
| JP | 2004-349184 | 12/2004 |
| JP | 2005-018175 | 1/2005 |
| JP | 2005-033857 | 2/2005 |
| JP | 2005-050581 | 2/2005 |
| JP | 2005-084162 | 3/2005 |
| JP | 2005-086901 | 3/2005 |
| JP | 2005-087135 | 4/2005 |
| JP | 2005-092107 | 4/2005 |
| JP | 2005-134125 | 5/2005 |
| JP | 2005-216698 | 8/2005 |
| JP | 2005-302403 | 10/2005 |
| JP | 2005-315980 | 11/2005 |
| JP | 2005-339983 | 12/2005 |
| JP | 2006-054118 | 2/2006 |
| JP | 2006-245983 | 9/2006 |
| JP | 2006-279650 | 10/2006 |
| JP | 2007-087849 | 4/2007 |
| JP | 2007-088957 | 4/2007 |
| JP | 2007-158993 | 6/2007 |
| JP | 2007-189774 | 7/2007 |
| JP | 2007-221400 | 8/2007 |
| WO | WO02/97710 A | 12/2002 |
| WO | WO03098175 A1 | 11/2003 |
| WO | WO2004030154 A2 | 4/2004 |
| WO | WO2005069203 A2 | 7/2005 |
| WO | WO2008000656 A1 | 1/2008 |

* cited by examiner

FIG. 5 ed, and together with the description serve to explain the principles and operation of the invention.

SIGNAL-PROCESSING SYSTEMS AND METHODS FOR RFID-TAG SIGNALS

BACKGROUND OF THE INVENTION

1. Field of the Invention

The present invention relates generally to radio-frequency identification (RFID) systems, and in particular relates to systems for and methods of processing RFID-tag signals that improve the readability of such signals by a RFID-tag reader.

2. Technical Background

Radio-frequency identification (RFID) is a remote recognition technique that utilizes RFID tags having information stored therein. The stored information is retrievable via radio-frequency (RF) communication between the RFID tag and a RFID-tag reader. The typical RFID system utilizes a RFID-tag reader, which is often designed to be hand held for the sake of mobility. When the RFID-tag reader is brought sufficiently close to a RFID tag, it can read a digital RFID-tag signal communicated by the tag. RFID systems are conventionally used for inventory management and product tracking in a variety of different industries, as well as in libraries and hospitals. The data encoded into a RFID tag can generally be written at a distance, and some types of REID tags can be re-written multiple times.

There are three main types of REID tags. The first type is a passive RFID tag that has a microcircuit (typically, a digital memory chip) with no internal power supply. The microcircuit includes or is coupled to an antenna. A passive RFID tag is powered by an incoming RF interrogation signal from the RFID-tag reader. The RF interrogation signal provides enough power for the microcircuit to communicate the information stored in the RFID tag to the RFID-tag reader via an electromagnetic RF tag signal from the RFID tag antenna.

The second type of RFID tag is semi-passive, and includes a microchip, antenna, and a small power supply that powers the microchip, allowing the RFID tag to operate and communicate a RFID tag signal without requiring power from the incoming RF signal, leading to a greater read range.

The third type of RFID tag is active and has its own power supply. Active RFID tags generate an outgoing RF tag signal and can respond to RF interrogations from the RF tag reader, or periodically generate their own outgoing RF tag signal.

In reading RFID tags, the RFID-tag reader interrogates the tag many times (e.g., more than 100 times) per second. The RFID-tag reader reads a corresponding RFID-tag signal for each interrogation. If the acquired RFID-tag signal does not correspond to a legitimate digital stream of a standardized protocol and error-checking method, then the acquired RFID-tag signal is identified as a "read error" and discarded. In practice, ambient electronic noise from a variety of sources (typically, machines and devices near the RFID tag or electronic noise in the RF circuitry of the reader) limits the range of the RFID-tag reader and causes many of the RFID interrogations to generate read errors. Other RFID-tag signal impairments can also occur, such as multi-path fading and bandwidth reduction and dispersion, which result in less-sharp rise and fall times. Consequently, only some of the RFID-tag signals are properly read, and the ability to properly read the RFID tag signals decreases with the distance between the RFID tag and the RFID-tag reader.

Improving the RFID reading capability of a RFID system can allow for a greater read range, smaller antenna sizes for the RFID tag, better RFID capability in electronically noisy environments, higher success rate of reading the RFID tag, etc.—all of which improve the RFID system efficiency while reducing system cost and user frustration.

SUMMARY OF THE INVENTION

One aspect of the invention is a method of reading an analog RFID-tag signal communicated from a RFID tag, wherein the analog RFID-tag signal comprises an original sequence of bits. The method includes receiving multiple copies of the analog RFID-tag signal, wherein at least some of the received multiple copies differ from each other due to, for example, noise or other signal impairments. The method also includes converting the received multiple copies of the analog RFID-tag signals to corresponding multiple received digitized RFID-tag signal representations each comprising a plurality of digital samples. The method further includes processing the multiple received digitized RFID-tag signal representations on a sample-by-sample basis to obtain a recovered digital RFID-tag signal representative of the original sequence of bits.

Another aspect of the invention is a RFID reader apparatus for reading an analog RFID signal communicated by a RFID tag, wherein the analog RFID signal comprises a sequence of bits. The apparatus includes an antenna adapted to receive analog RFID signals communicated by the RFID tag and to emit RFID tag interrogation signals that cause the RFID tag to communicate multiple copies of the analog RFID signal. The apparatus also includes a demodulator operably coupled to the antenna and adapted to demodulate the received analog RFID signals. The apparatus further includes an analog-to-digital (A/D) converter operably coupled to the demodulator and adapted to convert each demodulated analog RFID signal to a corresponding digitized RFID signal representation comprising a plurality of digital samples. The apparatus also includes a central processing unit (CPU) operably coupled to the demodulator. The CPU is adapted to process, on a sample-by-sample basis, multiple digitized RFID signal representations to recover a digital RFID signal representative of the sequence of bits.

Another aspect of the invention is a method of reading a RFID-tag signal communicated by a RFID tag and having an original sequence of bits. The method includes receiving multiple copies of the RFID-tag signal using a RFID-tag reader, wherein at least some of the received multiple copies differ from one another. The method also includes digitizing the received multiple copies to form digitized RFID-tag signal representations each comprising digitized samples. The method further includes processing the digitized RFID-tag signal representations to obtain a recovered digitized RFID-tag signal that yields the original sequence of bits.

Additional features and advantages of the invention will be set forth in the following detailed description, and in part will be readily apparent to those skilled in the art from that description or recognized by practicing the invention as described herein, including the following detailed description, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

DETAILED DESCRIPTION OF THE PREFERRED EMBODIMENTS

Reference will now be made in detail to the present preferred embodiments of the invention, examples of which is/are illustrated in the accompanying drawings. Whenever possible, the same reference numbers or letters are used throughout the drawings to refer to the same or like parts. In the description below, only those elements necessary for understanding and implementing the invention are shown.

Figure 1:
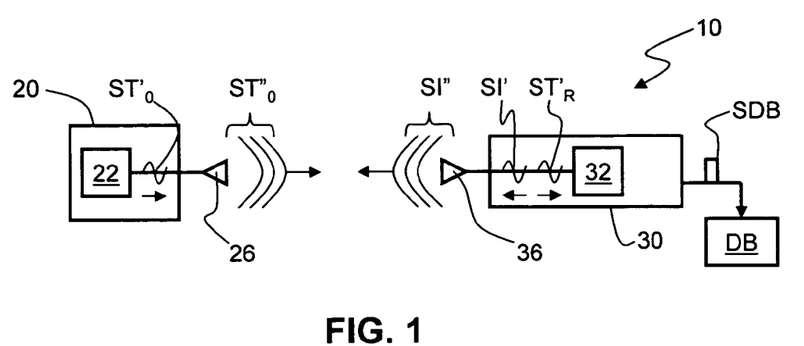
FIG. 1 is a schematic diagram of an example embodiment of a RFID system according to the present invention having a signal-processing circuit adapted to carry out the signal-processing method of the RFID-tag signals according to the present invention.

FIG. 1 is a schematic diagram of an example embodiment of a RFID system 10 according to the present invention as adapted to carry out the RFID-tag signal signal-processing method according to the present invention. RFID system 10 includes a RFID tag 20 that includes a microcircuit 22 electrically coupled to an antenna 26. Microcircuit 22 is adapted to store digital information and generate a digital signal comprising a sequence of bits representative of the stored information.

RFID system 10 also includes a RFID-tag reader 30 that includes a signal-processing circuit 32 electrically coupled to a transmit/receive antenna system ("antenna") 36. Note that antenna 36 could include separate transmit and receive antennas rather than a single transmit/receive antenna. The single-antenna embodiment is described below for the sake of illustration.

In an example embodiment, RFID-tag reader 30 is operably coupled (e.g., via an electrical line, optical fiber, wireless connection, etc.) to an external database DB that stores the RFID-tag information as read by the RFID-tag reader.

Figure 2:
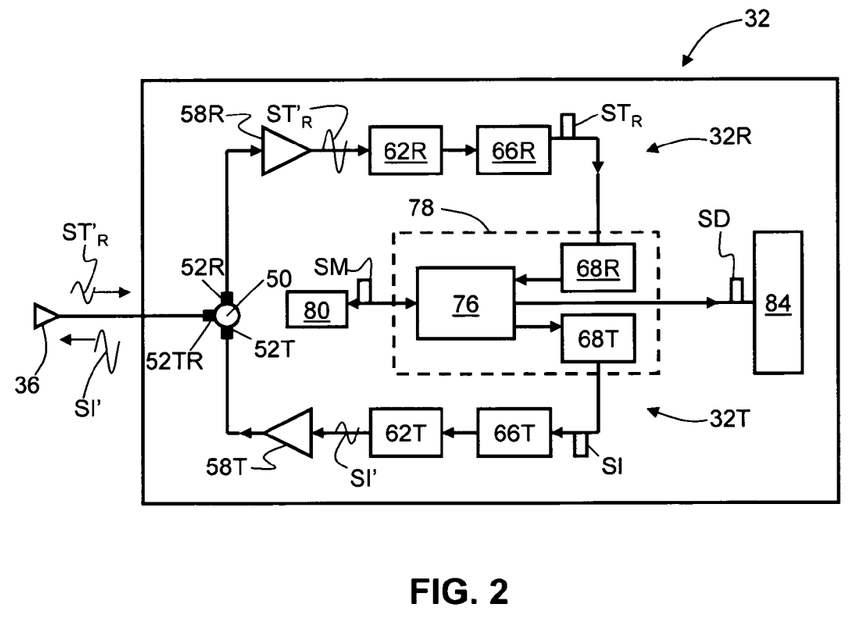
FIG. 2 is a schematic diagram of an example embodiment of a signal-processing circuit for the RFID-tag reader of FIG. 1.

FIG. 2 is a schematic diagram of an example embodiment of signal-processing circuit 32 of RFID-tag reader 30. Circuit 32 includes a three-port signal-directing element 50 electrically coupled to antenna 36. Three-port signal-directing element 50 has a transmit/receive port 52TR, a receiving-side port 52R and a transmitting-side port 52T. Signal-processing circuit 32 includes a receiving amplifier 58R electrically coupled to receiving-side port 52R, a receiving demodulator 62R electrically coupled to the receiving amplifier, a receiving analog-to-digital (A/D) converter 66R electrically coupled to the receiving demodulator, and a receiving digital signal processor 68R electrically coupled to the receiving A/D converter.

Circuit 32 also has a microprocessor 76 electrically coupled to receiving digital signal processor 68R. Microprocessor 76 is adapted (e.g., programmed) to control the overall operation of signal-processing circuit 32, including signal transmission and reception (as discussed below), and performing logic and computing operations on processed signals, including carrying out the RFID-tag signal signal-processing methods described below.

Antenna 36, three-port signal-directing element 50, receiving amplifier 58R, receiving demodulator 62R, receiving A/D converter 66R, receiving digital signal processor 68R and microprocessor 76 constitute an example embodiment of a RF receiver 32R.

Signal-processing circuit 32 also includes a transmitting amplifier 58T electrically coupled to transmitting-side port 52T, a transmitting modulator 62T electrically coupled to the transmitting amplifier, a transmitting digital-to-analog (D/A) converter 66T electrically coupled to the modulator, and a transmitting digital signal processor 68T electrically coupled to the transmitting D/A converter and to microprocessor 76.

Antenna 36, three-port signal-directing element 50, transmitting amplifier 58T, transmitting modulator 62T, transmitting D/A converter 66T, transmitting digital signal processor 68T and microprocessor 76 constitute an example embodiment of a RF transmitter 32T. Thus, in an example embodiment, signal-processing circuit 32 comprises an RF transmitter 32T and a RF receiver 32R that have some common elements, namely antenna 36, signal-directing element 50, and microprocessor 76.

In an example embodiment, receiving digital signal processor 68R, transmitting digital signal processor 68T and microprocessor 76 constitute a central processing unit (CPU) 78. In an example embodiment, this CPU is formed from a field-programmable gate array (FPGA), and in another example embodiment is formed from an integrated circuit designed specifically for the particular purpose of the present invention (i.e., an application-specific integrated circuit or ASIC).

Signal-processing circuit 32 also includes a memory unit 80 electrically coupled to microprocessor 76, and a display unit 84 electrically coupled to the microprocessor. Memory unit 80 is adapted to store information, such as RFID-tag reader settings and status, and processed data such as raw and/or processed RFID-tag signals, as described below. Memory unit 80 also serves as a computer-readable medium for storing computer-executable instructions for carrying out the methods of the present invention either via the operation of microprocessor 76 or via the operation CPU 78 as a whole, as described below. In an example embodiment, memory unit 80 is included in CPU 78.

Method of Operation

In an example embodiment of the operation of RFID system 10, RFID-tag reader 30 transmits an interrogation signal SI" to RFID tag 20, as illustrated in FIG. 1. This is accomplished using RF transmitter 32T of signal-processing circuit 32, as shown in FIG. 2. In particular, microprocessor 76 directs transmitting signal processor 68T to generate a digital signal having an interrogation bit stream. This digital signal is converted to an analog signal via D/A converter 66T. This analog signal is then modulated onto a RF carrier by transmitting modulator 62T to form analog interrogation signal SI'. Analog interrogation signal SI' is then amplified by transmitting amplifier 58T and enters signal-directing element 50 at transmitting port 52T. The amplified analog interrogation signal SI' is then directed out of transmitting/receiving port 52TR to antenna 36, which converts signal SI' into an electromagnetic interrogation signal SI" (FIG. 1).

Electromagnetic interrogation signal SI" is received by RFID tag antenna 26, which converts this signal back into analog interrogation signal SI'. RFID tag microcircuit 22 receives analog interrogation signal SI', converts it to digital interrogation signal SI, and processes this signal to assess whether it has the proper interrogation bit stream. If necessary, microcircuit 22 uses the energy in the interrogation signal to power itself.

If the proper interrogation bit stream is identified by microcircuit 22, then the microcircuit generates an "original" digital RFID-tag signal $ST_O$ having a bit sequence that represents information stored in the microcircuit memory (not shown). Microcircuit 22 includes an A/D converter and other electronic circuitry (not shown) that converts original digital RFID-tag signal $ST_O$ to an analog signal that is used to modulate the incoming RF carrier to form analog RFID-tag signal $ST'_O$. Analog RFID-tag signal $ST'_O$ is then communicated by RFID tag antenna 26 as an electromagnetic RFID-tag signal $ST''_O$ representative of the original bit sequence in the digital RFID-tag signal $ST_O$.

Electromagnetic RFID-tag signal $ST''_O$ is received by RFID-tag reader 30. Specifically, signal $ST''_O$ is received and processed by RF receiver 32R. RFID-tag reader antenna 36 converts signal $ST''_O$ into a received analog RFID-tag signal $ST'_R$. Analog RFID-tag signal $ST'_R$ typically is not the same as the original electrical analog RFID-tag signal $ST'_O$ due to any one of a number of factors, such as ambient electronic noise, attenuation due to an intervening object or medium, multi-path propagation effects, or the read distance being at or over its normal limit.

RFID-tag signal $ST'_R$ travels from antenna 36 to signal-directing element 50, which directs the signal out of receiver-side port 52R to receiving amplifier 58R, which amplifies this signal. The amplified signal $ST'_R$ then proceeds to receiving demodulator 62R, which demodulates the signal to recover the base analog signal, which might be further impaired by thermal and circuit noise of signal-processing circuit 32. The impaired base analog signal then proceeds to receiving A/D converter 66R, which converts this signal into a received digitized RFID-tag signal representation $ST_R$ comprising a plurality of digital samples. The digitized signal may be highly oversampled and the quantization of the samples may have many levels, causing the digitized signal representation to have many more bits than the original digital signal. This digitized signal representation proceeds to receiving digital signal processor 68R for signal processing. Here, the term "signal processing" optionally includes signal conditioning, as described below, in addition to digital signal processing of the digitized signals.

The RFID tag reading method of the present invention includes carrying out the above-described RFID-tag interrogation process multiple times, thereby causing RFID tag 20 to communicate multiple copies of the original RFID-tag signal $ST''_O$. The RFID-tag reader 30 may send a single interrogation signal or multiple interrogation signals to the RFID tag 20 to cause the RFID tag to communicate multiple copies of the original RFID-tag signal $ST''_O$. RFID-tag reader 30 then reads (i.e., receives and processes) each communicated RFID-tag signal as described above, wherein at least some of the received digitized RFID-tag signal representations $ST_R$ differ from each other, e.g., due to noise or other impairments. Thus, receiving digital signal processor 68R is adapted to process multiple digitized RFID-tag signal representations $ST_R$.

Figure 3A:
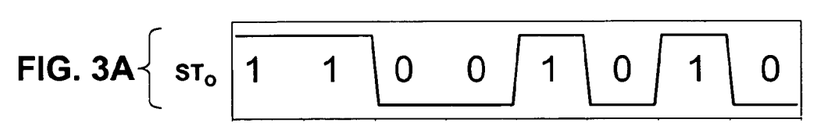
FIG. 3A is a simulated time plot of an example digital RFID-tag signal ($ST_O$) as generated by the microcircuit in the RFID tag and having an example bit sequence of 11001010.
Figure 3B:
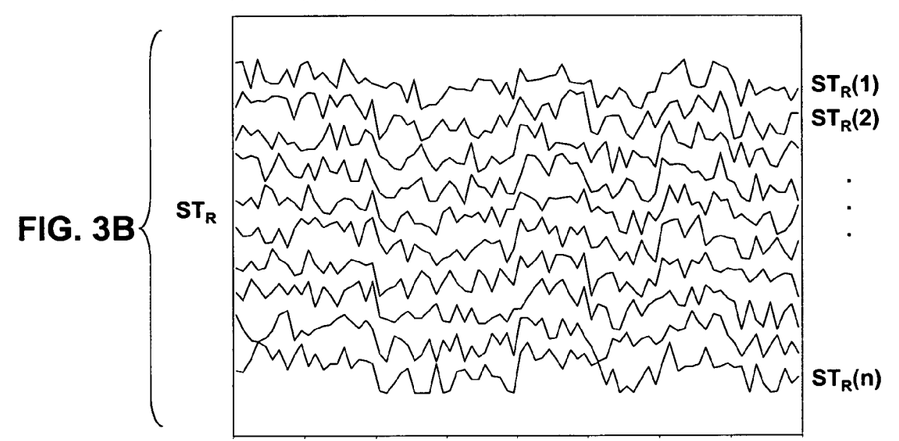
FIG. 3B is a simulated time plot of ten received digitized RFID-tag signals $ST_R$ based on the example digitized RFID-tag signal $ST_O$ of FIG. 3A as received by the RFID-tag reader.

FIG. 3A is a simulated time plot of an example of the original digital RFID-tag signal $ST_O$ as generated by microcircuit 22 of RFID tag 20. Signal $ST_O$ comprises the sequence of bits 11001010. FIG. 3B is a time plot of ten digitized RFID-tag signal representations $ST_R$ of FIG. 3A as read by RFID-tag reader 30. Note that the ten digitized RFID-tag signal representations $ST_R(ST_R(1), ST_R(2), \ldots ST_R(n)$, wherein n=10) differ from each other according to a noise impairment in this example, and that no one signal could be used to recover the original bit sequence of the original RFID-tag signal $ST_O$ shown in FIG. 3A. Other impairments could occur as well, and the particular example of FIG. 3A is used by way of illustration.

In order to recover the original bit sequence in original digital RFID-tag signal $ST_O$, in an example embodiment receiving digital signal processor 68R processes the different digitized RFID-tag signal representations $ST_R(1), ST_R(2), \ldots ST_R(n)$ on a sample-by-sample basis to obtain a recovered digitized RFID-tag signal representation that closely matches the original digital RFID-tag signal $ST_O$ and the bit sequence therein.

The recovered bit sequence is then provided to microprocessor 76 for further processing, e.g., for storage in memory unit 80 via a memory signal SM, to display on display 84 via a display signal SD, or transmission to external database DB via an external database signal SDB (FIG. 1).

Figure 3C:
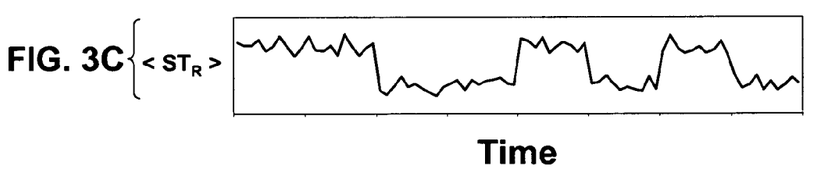
FIG. 3C plots the sample-by-sample average of the ten digital RFID-tag signals $ST_R$ of FIG. 3B.

Digital-signal processor 68R is adapted to process the different digitized RFID-tag signal representations $ST_R(1), ST_R(2), \ldots ST_R(n)$ on a sample-by-sample basis. One example embodiment of this sample-by-sample processing involves sample-by-sample averaging. FIG. 3C illustrates the simulated result of a sample-by-sample averaging process as carried out by receiving digital signal processor 68R for the ten different versions of the received digitized RFID-tag signal representations $ST_R$ of FIG. 3B. The average received digitized RFID-tag signal representation $<ST_R>$ provides a slightly noisy but otherwise accurate representation of its original counterpart $ST_O$ and the sequence of bits therein as generated by RFID tag 20. This example illustrates the power of sample-by-sample signal averaging to reduce noise impairments.

In an example embodiment, the different versions of the received digitized RFID-tag signal representations $ST_R$ are stored in memory unit 80 and are then sample-by-sample processed by microprocessor 76 or receiving digital signal processor 68R. In another example embodiment, the sample-by-sample processing occurs in real-time in receiving digital signal processor 68R as each digitized RFID-tag signal representation is received. In an example embodiment, the sample-by-sample processing stops when a suitable degree of convergence on the final form of the digitized RFID-tag signal representation is achieved, or when the recovered digital signal has the proper cyclic redundancy check value.

In an example embodiment wherein the signal processing includes sample-by-sample averaging, the averaging process starts off with averaging two received digitized RFID-tag signal representations $ST_R$ and averaging an increasing number of such signal representations until the calculated average RFID-tag signal representation $<ST_R>$ does not change significantly as a function of the number of averaged signal representations. The measure of the degree of convergence can be performed in a number of different ways, such as on a sample-by-sample basis, by performing a correlation between different averaged signal representations, etc. More generally, an example embodiment of the invention involves sample-by-sample processing of an increasing number of digitized RFID-tag signal representations $ST_R$ until the recovered digitized RFID-tag signal remains substantially constant.

Figure 4:
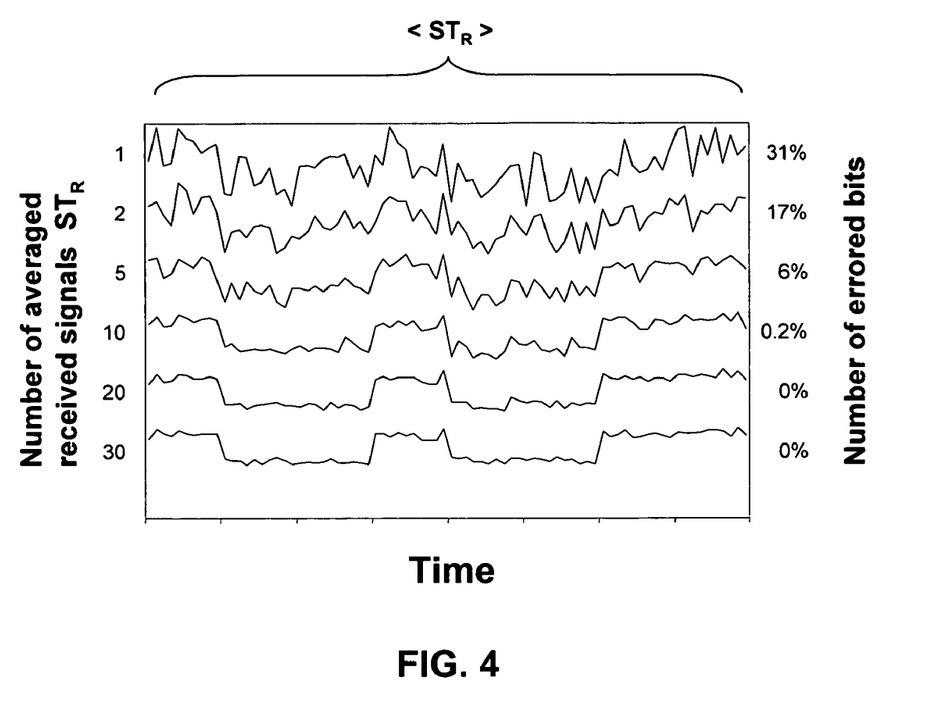
FIG. 4 is a simulated time plot of the sample-by-sample average $<ST_R>$ of received digitized RFID-tag signal representations $ST_R$ for different numbers of received digital RFID-tag signal representations, showing the percentage of errored bits for the received digital RFID-tag signal representations, illustrating how averaging an increasing number of received digital RFID-tag signal representations on a sample-by-sample basis increasingly reduces the percentage of errored bits.

FIG. 4 is a simulated time plot of the average received RFID-tag signal representation $<ST_R>$ as calculated using different numbers of received signal representations $ST_R$. The plot shows the percentage of errored bits on the right-hand axis. As the plot indicates, a single received RFID-tag signal representation $ST_R$ has 31% errored bits. Averaging two received RFID-tag signal representations $ST_R$ reduces the errored bits to 17%, and averaging five received RFID-tag signal representations $ST_R$ reduces the errored bits to 6%. After averaging ten received signal representations $ST_R$, the errored bits is reduced to 0.2%, and averaging twenty or more received RFID-tag signal representations $ST_R$ reduces the errored bits to 0%. Note also that the average received RFID-tag signal representation $<ST_R>$ remains substantially unchanged from averaging ten received signal representations $ST_R$ versus averaging twenty such signal representations. The simulation indicates that for this example, sample-by-sample averaging of ten or so received RFID-tag signal representations $ST_R$ provides adequate resolution to recover the original bit sequence in original digital RFID-tag signal representation $ST_O$ and thus to successfully read the RFID tag. This also supports the above-described example method of the invention that includes averaging of multiple received signal representations using an increasing number of received signal representations until the average received RFID-tag signal representation remains substantially constant, or until the recovered digital signal has the proper cyclic redundancy check value.

Since original RFID-tag signals $ST_O$ can be generated and communicated rapidly by RFID tag 22 (e.g., in a few milliseconds for ten transmissions), and because the digital signal processing method in RFID-tag reader 30 can be carried out equally fast by signal-processing circuit 32, there is no substantial delay in reading the RFID tag using the systems and methods of the present invention.

Other Applicable Signal-Processing Techniques

In addition to the above-described example sample-by-sample signal-processing technique of the digitized RFID-tag signal representations $ST_R$, there are a number of other signal processing techniques and variations applicable to the present invention. These are now discussed below. For the purposes of the present invention, "signal conditioning" generally describes signal-processing techniques other than sample-by-sample signal processing.

Sample-by-Sample Signal Processing

In order to efficiently process multiple digitized RFID-tag signal representations $ST_R$, it is useful to ensure that they are synchronized. Thus, in an example embodiment of the present invention, signal-processing circuit 32 is adapted to synchronize the multiple received RFID-tag signal representations $ST_R$ using, for example, clock recovery techniques. In an example embodiment of this approach, a synchronization bit pattern is provided to the RFID-tag bit sequence in the original RFID-tag signal $ST_O$ to facilitate this synchronization.

In another example embodiment of the present invention, signal-processing circuit 32 is adapted to shift individual received signal representations $ST_R$ back and forth in time to maximize correlation with other received signal representations from the same RFID tag. This serves to ensure that the different samples are "lined up," thereby making the sample-by-sample averaging process more efficient.

In another example embodiment of the present invention, signal-processing circuit 32 is adapted to perform a number of digital sampling techniques. One such technique is called "oversampling," which involves taking many digital samples per bit of the analog RFID-tag signal $ST'_R$—that is, more samples than are required by the sampling theorem to recover the sampled signal. In combination with the process of quantization (including using two or more digital levels per sample), a high-resolution digitized RFID-tag signal representation $ST_R$ of the received analog RFID-tag signal $ST'_R$ is obtained. Using this technique, the number of bits used to form the digitized RFID-tag signal representation $ST_R$ is greater than (and is preferably significantly greater than) the number of bits in the RFID-tag signal itself. Such sampling and quantization is readily accommodated by signal-processing circuit 32, which using present-day integrated circuit technology can operate with cycle times many orders of magnitude faster than the bit periods of the RFID-tag signal.

Other examples of sample-by-sample signal processing include: correlation techniques (e.g., averaging the product of two consecutive samples), digital filtering (or equivalently, weighted averaging of the samples), averaging the square of the samples, threshold detection of each sample followed by averaging the resulting binary states, and estimation theory techniques. In an example embodiment, the best sample-by-sample processing approach (or combination of approaches) to use is determined empirically for a given set of RFID-tag reading conditions. For example, one can start with simple sample-by-sample averaging and add other variations (e.g., weighted averaging), etc., and/or appropriate signal-conditioning types of signal processing (as discussed below) until a satisfactory recovered digital RFID-tag signal is obtained.

Signal Conditioning

In another example embodiment of the present invention, signal-processing circuit 32 is adapted to carry out digital signal processing in the form of "signal conditioning." In an example embodiment, signal conditioning is performed on one or more of the digital RFID-tag signal representations so as to improve the quality of the one or more received signal representations before further signal processing. In another example embodiment, signal conditioning is applied to the recovered digital RFID-tag signal.

Signal conditioning techniques are generally used to mitigate errors. Example signal conditioning suitable for the present invention include, for example, smoothing, filtering (e.g., matched filtering to restore the bandwidth and correct for rise/fall times, or Fourier-domain filtering to remove frequency components outside of the known signal band), clock recovery, impulse-response deconvolution, and the use of coding techniques such as cyclic redundancy coding (CRC), forward error correction (FEC) and the like. Other signal conditioning techniques include forming linear (e.g., weighted averaged) combinations of the multiple received RFID-tag signal representations, non-linear combinations of the multiple received RFID-tag signal representations, and digital filtering wherein undesired frequency components are removed or attenuated from the multiple received RFID-tag signal representations.

In an example embodiment, one or more suitable signal-conditioning techniques are applied to each digitized RFID-tag signal representation $ST_R$ prior to performing sample-by-sample processing of the signal representations.

In another example embodiment, one or more suitable signal-conditioning techniques are applied to the recovered digitized RFID-tag signal. The aforementioned coding techniques are best performed on the recovered digitized RFID-tag signal. Coding techniques typically involve adding a small number of bits to the communicated original digital RFID-tag signal $ST_O$. These extra bits allow the recovered digitized RFID-tag signal to be checked or improved to ensure that it is the same as or otherwise suitably represents the original digital RFID-tag signal.

Example Algorithm

Figure 5:
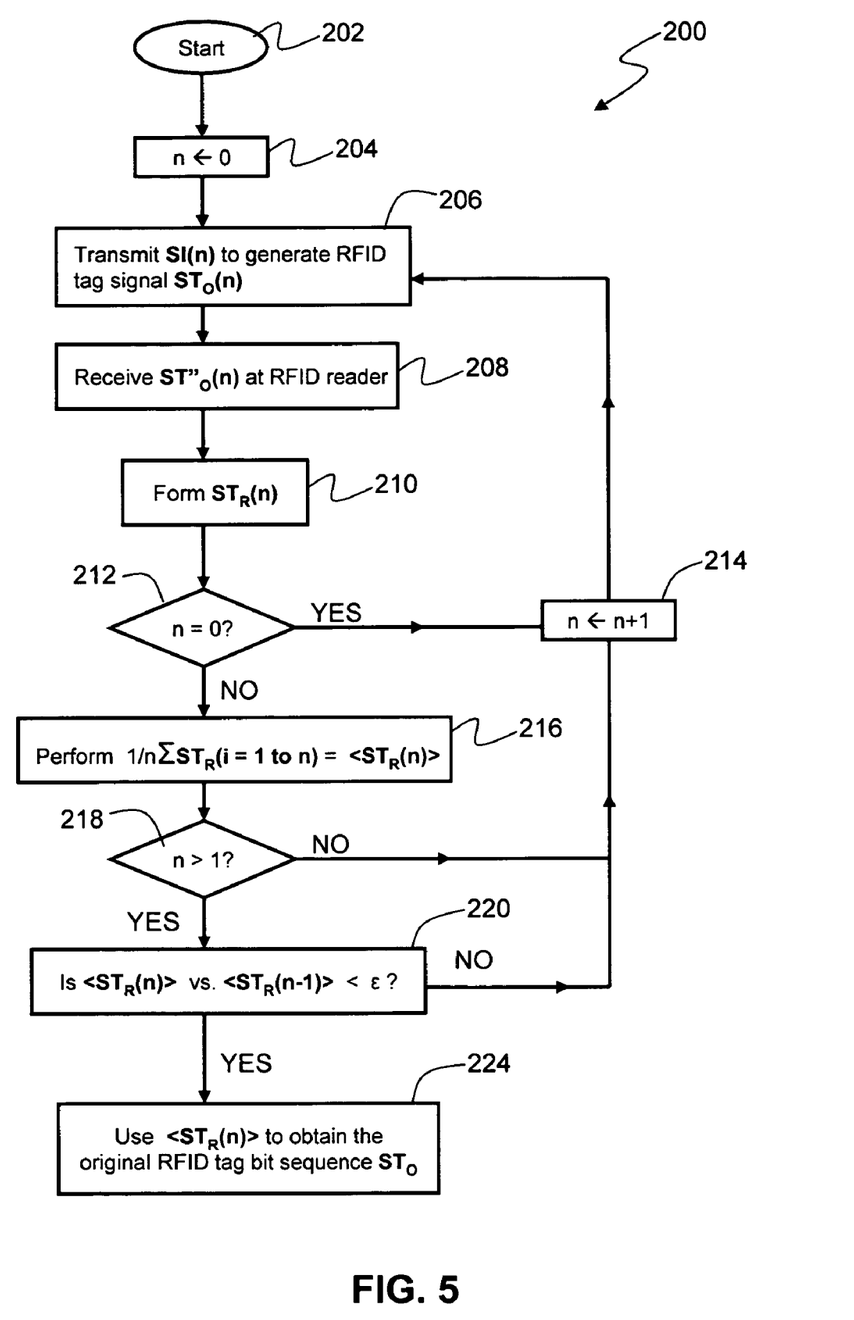
FIG. 5 is a flow diagram of an example algorithm describing an example of the RFID-tag reading method of the present invention wherein the sample-by-sample signal processing includes averaging the digitized RFID-tag signal representations.

FIG. 5 is a flow diagram 200 of an example algorithm that includes acts 202 through 224 for carrying out an example of the RFID-tag reading method of the present invention, wherein the sample-by-sample signal processing includes simple averaging for the sake of illustration.

The algorithm starts at 202 and immediately proceeds to 204, which assigns counting integer n to zero. In 206, RFID-tag reader 30 transmits a (first) interrogation signal SI(n)=SI(0), which causes cause RFID tag 20 to communicate a (first) digitized RFID-tag signal $ST_O(n)=ST_O(0)$.

In 208, the corresponding electromagnetic RFID-tag signal $ST''_O(0)$ is received by RFID-tag reader 30. In 210, the RFID-tag reader forms the corresponding received digitized RFID-tag signal representation $ST_R(0)$, which as discussed above is different from the original digital RFID-tag signal $ST_O$ generated by RFID tag 20 due to the aforementioned noise effects.

Query 212 asks whether counter n=0. Since for the first iteration, the answer to this query is "YES," the first received digitized RFID-tag signal $ST_R(0)$ can be stored in memory unit 80. The process then proceeds to 214, which increments counting integer n by 1. The process then returns to 206, and 206 through 210 are repeated for n=1. This results in two received digitized RFID-tag signal representations $ST_R(0)$ and $ST_R(1)$, which can both be stored in memory unit 80 via the operation of microprocessor 76.

Since the result of query 212 is now n≠0, the process moves to 216, wherein the two received digitized RFID-tag signals are processed. In an example embodiment, a sample-by-sample average of digitized RFID-tag signal representations $ST_R(0)$ and $ST_R(1)$ is performed. In example embodiments, this average is performed either by microcircuit 76 operating on the digitized RFID-tag signals stored in memory unit 80, or in real-time by signal processor 68R. This provides a first sample-by-sample average digitized RFID-tag signal representation $<ST_R(n)>=<ST_R(1)>$.

Since n=1, 218 sends the process back to 214, which increments the counting integer n by one. The process then returns to 206, where 206 through 216 are repeated to form a second average digitized RFID-tag signal representation $<ST_R(n)>=<ST_R(2)>$, which is the sample-by-sample average of the three received digitized RFID-tag signal representations $ST_R(0)$, $ST_R(1)$ and $ST_R(2)$.

Since now in 218 n>1, the algorithm then proceeds to 220, which asks whether the differences between the latest average digitized RFID-tag signal representation $<ST_R(n)>=<ST_R(2)>$ and the previous average digitized RFID-tag signal representation $<ST_R(n-1)>=<ST_R(1)>$ is less than some threshold value ϵ. In other words, 220 asks whether the average digitized RFID-tag signal remains substantially constant as a function of the increasing number of received digitized RFID-tag signal representations $ST_R$ used to form the average. Here, the comparison can be performed in any number of ways, such as on a sample-by-sample basis, by performing a correlation calculation, or by Fourier-transforming the two averages and comparing their frequency-domain counterparts.

If the answer for 220 is "NO," then the process moves to 214 where the counting integer n is incremented by 1. The process then returns to 206, and 206 through 220 are repeated, wherein in 220 the average digitized RFID-tag signal representations $<ST_R(3)>$ and $<ST_R(2)>$ are compared. If necessary, 206 through 220 are repeated until a comparison between $<ST_R(n)>$ and $<ST_R(n-1)>$ satisfies the condition in 220. If the comparison in 220 does not converge, then the parameter E is reset to avoid an infinite loop. Once the condition in 220 is satisfied, then in 224 the average digitized RFID-tag signal representation $<ST_R(n)>$ is used to obtain the original bit sequence in original digital signal $ST_O$ generated by RFID tag 20, and thus obtain the RFID tag information.

In an example embodiment, signal-processing circuit 32 is adapted (e.g., programmed) to carry out the algorithm of flow diagram 200. In a particular example embodiment, the algorithm of flow diagram 200 is embodied in (e.g., programmed in the software or firmware of) microprocessor 76 and/or in memory unit 80 so that the microprocessor (or CPU 78) can control the operation of signal-processing circuit 32 to carry out the RFID-tag reading method of the present invention.

In an example embodiment the sample-by-sample averaging process and the comparison of $<ST_R(n)>$ and $<ST_R(n-1)>$ in 220 of flow-diagram 200 are carried out by receiving digital signal processor 68R and the resulting digitized signal representation provided to microprocessor 76 for further processing and/or distribution.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of reading an analog radio-frequency identification (RFID) signal communicated by a RFID tag, wherein the analog RFID signal comprises a sequence of bits, comprising:
   causing the RFID tag to communicate multiple copies of the analog RFID signal;
   receiving the multiple copies of the analog RFID signal, wherein at least some of the received multiple copies differ from each other;
   converting the multiple received analog RFID signals to corresponding multiple digitized RFID signal representations each comprising a plurality of digital samples; and
   processing the multiple digitized RFID signal representations on a sample-by-sample basis to obtain a recovered digital RFID-tag signal representative of said sequence of bits.

2. The method of claim 1, wherein said processing includes averaging a plurality of digitized RFID signal representations among the multiple digitized RFID signal representations.

3. The method of claim 2, wherein said averaging is performed to obtain an average received digital RFID-tag signal representation, and further including:
performing said averaging using an increasing number of received digitized RFID signal representations until the recovered average received digital RFID-tag signal representation remains substantially constant.

4. The method of claim 1, wherein causing the RFID tag to communicate multiple copies of the analog RFID signal includes interrogating the RFID tag with an RFID-tag reader.

5. The method of claim 1, wherein said processing includes performing signal conditioning on at least one of the multiple digitized RFID signal representations.

6. The method of claim 1, wherein said processing includes performing signal conditioning on the recovered digital RFID-tag signal.

7. The method of claim 1, wherein said processing includes performing signal conditioning that includes cyclic redundancy coding.

8. The method of claim 1, wherein said converting includes performing at least one of oversampling and multi-level quantization.

9. The method of claim 1, further including recovering the sequence of bits from the recovered digital RFID-tag signal representative of said sequence of bits.

10. The method of claim 9, further including at least one of:
a) storing the recovered sequence of bits in a memory unit of a RFID-tag reader and/or in an external database; and
b) displaying information representative of the recovered sequence of bits.

11. The method of claim 1, wherein said processing includes at least one of threshold detection, signal squaring, correlation between two samples, digital filtering, and synchronization, as applied to the multiple digitized RFID signal representations.

12. A radio-frequency identification (RFID) reader apparatus for reading an analog RFID signal communicated by a RFID tag, wherein the analog RFID signal comprises a sequence of bits, comprising:
an antenna adapted to receive analog RFID signals communicated by the RFID tag and to emit RFID tag interrogation signals so as to cause the RFID tag to communicate multiple copies of the analog RFID signal;
a demodulator operably coupled to the antenna and adapted to demodulate the received analog RFID signals;
an analog-to-digital (A/D) converter operably coupled to the demodulator and adapted to convert each demodulated analog RFID signal to a corresponding digitized RFID signal representation comprising a plurality of digital samples; and
a central processing unit operably coupled to the demodulator and adapted to process, on a sample-by-sample basis, multiple digitized RFID signal representations to obtain a digitized RFID signal representative of said sequence of bits.

13. The apparatus of claim 12, further including an external database operably coupled to the central processing unit and adapted to store, for one or more RFID tags, the sequence of bits for each of the RFID tags as recovered from the corresponding digitized RFID signal representative of said sequence of bits.

14. The apparatus of claim 12, wherein the central processing unit is adapted to perform at least one of the following operations:
a) sample-by-sample averaging of multiple digitized RFID signal representations; and
b) signal conditioning on one or more of the multiple digitized RFID signal representations.

15. A method of reading a RFID-tag signal communicated by a RFID tag and having an original sequence of bits, the method comprising:
receiving multiple copies of the RFID-tag signal using a RFID-tag reader, wherein at least some of the received multiple copies differ from one another;
digitizing the received multiple copies to form digitized RFID-tag signal representations each comprising digital samples; and
processing the digitized RFID-tag signal representations on a sample-by-sample basis to obtain a recovered digitized RFID-tag signal that yields said original sequence of bits.

16. The method of claim 15, wherein said processing includes averaging a plurality of digitized RFID-tag signal representations among the digitized RFID-tag signal representations.

17. The method of claim 15, wherein the sample-by-sample processing is performed on an increasing number of the digitized RFID-tag signal representations until the recovered digitized RFID-tag signal remains substantially constant.

18. The method of claim 15, further including carrying out said processing in a signal-processing circuit having a computer-readable medium with corresponding computer-readable instructions for performing said sample-by-sample processing embodied therein.

19. The method of claim 15, wherein said processing includes performing signal conditioning on at least one digitized RFID-tag signal representation.

20. The method of claim 15, wherein said processing includes performing signal conditioning on the recovered digitized RFID-tag signal.

21. The method of claim 15, wherein said digitizing includes performing at least one of oversampling and multi-level quantization.

22. The method of claim 15, including using an analog-to-digital converter to perform said digitizing.

23. The method of claim 15, wherein said processing includes at least one of threshold detection, signal squaring, correlation between two samples, digital filtering, and synchronization, as applied to the digitized RFID-tag signal representations.

24. The method of claim 15, wherein said processing includes averaging a plurality of digital samples among the digitized RFID-tag signal representations.

* * * * *